United States Patent Office 2,822,091
Patented Feb. 4, 1958

2,822,091

FILTRATION OF SOLUTIONS

James L. Martine, Jr., Ferguson, Mo., assignor to Aluminum Company of America, Pittsburgh, Pa., a corporation of Pennsylvania No Drawing. Application February 25, 1955
Serial No. 490,678

3 Claims. (Cl. 210—75)

This invention relates to filtration, and relates more particularly to filtering of alkali metal aluminate solutions.

In the well-known process of extracting alumina from its ores by caustic digestion of the ore, there is produced a highly alkaline sodium aluminate solution and an undissolved residue called "red mud." Following the digestion operation the red mud is separated from the sodium aluminate solution by sedimentation or thickening and a subsequent filtration of the solution through a filter press or the like having a porous filter, such as cloth made of cotton or wire, to remove the remaining red mud particles. The latter particles are very finely divided, the major portion of them being smaller than 5 microns, and rapidly clog the pores in the filter cloth, with the result that the filtration operation is impeded.

The use of granular filter aids to facilitate removal of solids from solutions and to minimize clogging of filters is well-known. However, the commonly used filter aids—such as diatomaceous earth, sand, vermiculite, charcoal, and pyrophyllite—are not satisfactory for use in the filtration of the above mentioned solutions because they introduce undesirable impurities into the solutions, cannot be recovered readily for re-use, or are unduly expensive.

It is the object of this invention to provide a method of improving the filtration of alkali metal aluminate solutions by the use of a new type of low-cost filter aid which is highly effective in removing solids from such solutions, is easily removed from the porous filter media, and can be recovered readily for re-use.

In accordance with my invention a red mud fraction containing less than 25% by weight of particles having a maximum width of less than 10 microns, and containing not more than 30% by weight of particles larger than 150 microns in maximum width, is used as a filter aid in the filtration of sodium aluminate solutions. Red mud produced in caustic digestion of alumina-bearing ores normally contains only a small proportion of material in the above mentioned particle size range, usually about 5 to 15% by weight. That fraction can be recovered by classification by well-known procedures.

The red mud filter aid referred to above facilitates flow of solution through the filter cloth, is inert to the sodium aluminate solution being filtered, and results in a high degree of removal of solids from the solution. Moreover, when desirable, the filter aid and accumulated filtered solids can be removed readily from the filter cloth by washing or by mechanical means, which advantage is reflected in the amount of solution filtered and in the length of usefulness of the porous filtering media. Also, the filter aid can be recovered by classification from the material removed from the filter cloth. The filter aid can be used advantageously with all of the various types of filters customarily used in filtering sodium aluminate solutions, such as pressure filters, drum filters, suction filters, and gravity filters. Preferably it is applied to the filter cloth by adding from 0.1 to 10.0 grams per liter thereof to the solution to be filtered, with the result that it is deposited on the filter cloth as the solution is filtered.

The amount of filter aid employed, and the particular size of particles and the size distribution, which are most suitable within the range mentioned above, depends to some extent on the particular conditions involved, such as the type of filter employed and the method used for applying the filter aid to the filter cloth. If the filter aid is fed into the solution to be filtered and deposited thereon on the cloth, the particles should be small enough to remain in suspension during flow of the solution to the filter cloth.

As an example of the results obtained through the use of my invention, red mud produced as an undissolved residue in a caustic digestion of bauxite was subjected to classification in a liquid-solid cyclone separator to obtain a red mud fraction for use as a filter aid, in which 82% of the particles were less than 150 microns in maximum dimension, 43% were less than 74 microns, 28% were less than 44 microns, 18% were less than 30 microns, and 13% were less than 10 microns. That fraction constituted 15% by weight of the original red mud fed to the liquid-solid cyclone separator. Sodium aluminate solution produced by caustic digestion of bauxite was subjected to sedimentation by known procedures to remove from it the major portion of the red mud which it carried. To the solution was then added 0.5 gram per liter of the above-mentioned filter aid, and the solution was filtered in a Kelly filter press in which the solution was fed under pressure through vertical canvas filter cloth at a rate of seven gallons per hour per square foot of filter cloth. The rate of flow of solution through the filter over a period of eight hours was 57% higher than when another portion of the solution was filtered under the same conditions, except that the red mud filter aid was not used. Moreover, the filtrate produced when the red mud filter aid was used was as free of red mud particles as the filtrate obtained without use of the filter aid.

I claim:

1. The method of filtering finely divided solids from sodium aluminate liquor produced by caustic digestion of alumina-bearing ore, comprising coating a porous filter with a layer of a filter aid consisting essentially of red mud formed in producing sodium aluminate solution by caustic digestion of alumina-bearing ore, less than 25% by weight of the particles of red mud in the said layer being less than 10 microns in maximum width, and not more than 30% by weight of the particles of red mud in the sand layer being greater than 150 microns in maximum width, and thereafter filtering the said liquor through the said layer of filter aid and the said porous filter.

2. A method in accordance with claim 1, in which the major portion of the said finely divided solids in the liquor are smaller than 5 microns in size.

3. A method in accordance with claim 1, in which prior to the said filtering step there is added to the said liquor 0.1 to 10.0 grams of the said filter aid per liter of liquor.

References Cited in the file of this patent
UNITED STATES PATENTS 2,387,714   Briggs ------------------ Oct. 30, 1945